C. M. BULLER.
PIPING.
APPLICATION FILED APR. 6, 1917.
1,343,706.
Patented June 15, 1920.
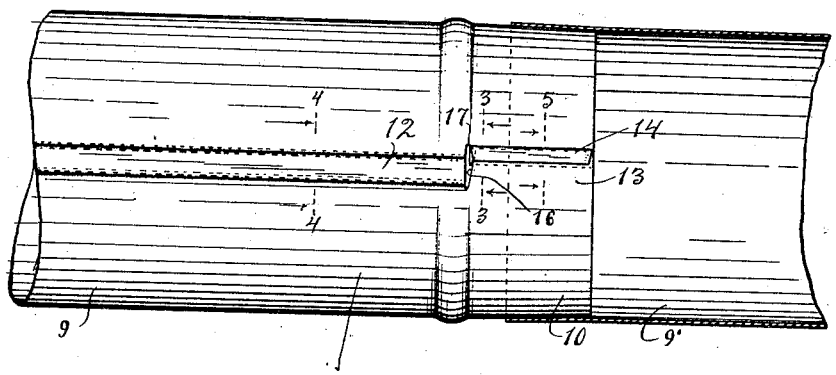
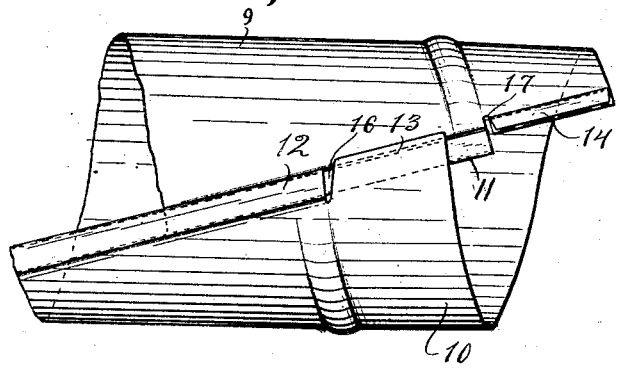
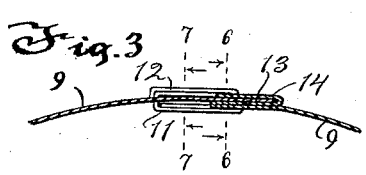
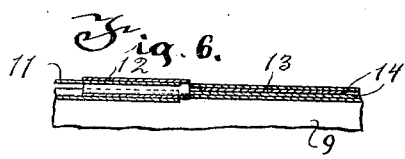
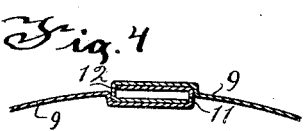
INVENTOR
Charles M. Buller.
By Morsell, Keeney & French.
ATTORNEYS

UNITED STATES PATENT OFFICE.

CHARLES M. BULLER, OF MILWAUKEE, WISCONSIN, ASSIGNOR TO L. J. MUELLER FURNACE COMPANY, OF MILWAUKEE, WISCONSIN, A CORPORATION OF WISCONSIN.

PIPING.

1,343,706.  Specification of Letters Patent.  Patented June 15, 1920.

Application filed April 6, 1917. Serial No. 160,175.

*To all whom it may concern:*

Be it known that I, CHARLES M. BULLER, a citizen of the United States, and resident of Milwaukee, in the county of Milwaukee and State of Wisconsin, have invented new and useful Improvements in Piping, of which the following is a description, reference being had to the accompanying drawings, which are a part of this specification.

The invention relates to furnace or stove piping.

The invention relates more particularly to a joint securing the edges of the sheet metal together to form the pipe section said joint being of such a kind that the end of said section which telescopes within the adjoining section is prevented from an inward buckling as has formerly been the case with piping of this kind using an interlocking edge connection.

The invention is further designed to provide a new and improved form of joint for a pipe section.

The invention further consists in the several features hereinafter set forth and more particularly defined by claim at the conclusion hereof.

In the drawings:

Figure 1 is a view of the joint embodying the invention, the adjoining pipe section being shown in section;

Fig. 2 is a perspective view of the pipe section during process of assembly;

Fig. 3 is a section taken on the line 3—3 of Fig. 1; Fig. 4 is a section taken on the line 4—4 of Fig. 1; Fig. 5 is a section taken on the line 5—5 of Fig. 1; Fig. 6 is a section taken on the line 6—6 of Fig. 3; Fig. 7 is a section taken on the line 7—7 of Fig. 3.

Fig. 8 is a section similar to Fig. 5 showing a modified construction.

In the drawings the numeral 9 indicates the pipe section as a whole which is formed from a single blank of sheet metal bent around and having its adjoining edges fastened together by an interlocking joint connection hereinafter described, one end 10 of the pipe section fitting within the opposite end of the adjoining pipe section 9', the edges of the pipe adjacent its joinder with this pipe section being so interlocked as to resist inward pressure causing distortion or buckling with consequent leaking or weakening at the joint.

Heretofore it has been common practice to provide an interlocking hook joint extending from one end of the pipe to the other whereby the adjoining edges of pipe section could be hooked together to resist outward movement but no provision was made for resisting inward movement which occurs when the adjoining pipe section is telescoped over one of such pipe sections, or for resisting lateral movement of the edges with respect to each other. It was to overcome this difficulty and to produce a pipe section which was not only strong and durable but easily and quickly assembled that the joint herein shown was devised.

This joint in effect consists of the combination of a hook over joint and sliding joint. The greater portion of the pipe is joined together by the usual hook over joint formed by bending one edge into a hooked edge 11 and the other into an inwardly extending hooked edge 12 whereby said edges can be readily drawn together and interlocked with each other to form a cylindrical pipe section and one in which resistance is offered to outward pressure occasioned by inserting the end of the adjoining pipe section within the end of the hooked joint portion of the pipe. The end 10 of the pipe section is formed with a sliding interlocking joint consisting of the straight edge or tongue 13 forming a continuation of the edge 12 and either an outwardly bent reinforced hook 14 as shown in Fig. 5 or an inwardly bent reinforced hook 15 as shown in Fig. 8. The tongue 13 is preferably separated from the hooked edge 12 by a cut out portion 16 to allow some play to permit ready assembling of the pipe section. For the same reason the hook 14 is preferably separated from the hooked edge 11 by a cut out portion 17 and there is a similar cut out portion employed when the hook 15 is used. It will be noted that the hooks 14 and 15 are doubled back on themselves adjacent the main portion of the pipe to form a reinforced hook. The tongue 13 is made to extend beyond the hooked edge 12 and the inner portion of the hook 14 is set back from the hooked edge 11, said tongue 13 and hook 14 lying in a plane within the plane of the hooked edges 11 and 12 to prevent lateral movement of the adjoining edges as shown in Fig. 3.

With the various parts of the joint construction as described when it is desired to assemble the pipe section, the hooked edges 11 and 12 are joined up by hooking them onto each other and slightly twisting the pipe as shown in Fig. 2. Then with the edges thus joined they are restored from their twisted to their normal shape by sliding them with respect to each other during which the edge 13 slides along the outerside of the hook 11 and is guided into the hook 14 and the edges thus lined up to form the cylindrical pipe section. As this upper sliding joint is of less width than that formed by the hooked portion 11 and 12 any appreciable lateral movement of the adjoining edges of the pipe section will be prevented as the tongue 13 will strike the end of the hooked joint 11 and 12 adjacent thereto and consequently the parts will be locked in place and in fact in assembling the joint the yielding tongue 13 as soon as it leaves the hooked edge 11 springs or snaps downwardly beneath the hooked connections 11 and 12 to lock the parts in position with the tongue 13 seated in the reinforced groove formed by the hook 14 when the large end of the adjoining pipe section is slid over it as shown in Fig. 1 inward relative movement of the parts at the joint is prevented and the pipe section thus reinforced at what is ordinarily its weakest point.

The invention thus exemplifies a combined hook over and sliding joint suitably reinforced and preferably locked in position.

What I claim as my invention is:

In a device of the class described, a pipe section comprising a one piece blank of bendable sheet material, an elongated tongue portion on each longitudinal edge thereof extending from a point spaced from one end of the blank for a greater portion of its length, one of said tongue portions being in the condition of having been bent outwardly and then folded over the blank to form a U-shaped flange on the outer side thereof, the other tongue portion being in the condition of having been bent inwardly and then folded over the blank to form a U-shaped flange on the inner side thereof, the corners of the closed ends of said U-shaped flanges being substantially angular to provide interlocking means to restrain the medial portion of the longitudinal edges of the blank from the pipe section from outward movement, whereby to prevent the spreading apart of the side edges of the pipe section intermediate its ends, a straight tongue formed on one edge of the pipe section and projecting beyond the longitudinal edge of the adjacent U-shaped flange and being spaced from the adjacent flange by a notched recess, a receiving locking groove formed on the portion of the edge opposite said tongue by folding the portion of the metal thereof backward upon itself and thence outward and spaced from the other portion thereof to form said locking groove, the side edges of said locking groove being inward of the longitudinal plane of the adjacent U-shaped flange and lying within the plane of the interlocking means, said tongue being slidably mounted in said groove to prevent inward movement of the said edges at that end of the pipe, and due to the disposition of said groove adapted to abut against the upper end of the interlockably retaining means of the pipe when moved against it and thereby preventing the inward sliding movement of the joined edges of the pipe.

In testimony whereof, I affix my signature.

CHARLES M. BULLER.